United States Patent
Ng

(10) Patent No.: US 8,970,496 B2
(45) Date of Patent: Mar. 3, 2015

(54) ERGONOMIC SLIDER-BASED SELECTOR

(75) Inventor: Chern Ann Ng, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 1141 days.

(21) Appl. No.: 12/103,137

(22) Filed: Apr. 15, 2008

(65) Prior Publication Data

US 2009/0259790 A1  Oct. 15, 2009

(51) Int. Cl.
*G06F 3/033* (2013.01)
*G06F 17/00* (2006.01)

(52) U.S. Cl.
USPC .............................. 345/163; 345/184; 463/37

(58) Field of Classification Search
CPC ............... G06F 3/01; G06F 3/02; G06F 3/03; G06F 3/0304; G06F 3/033; G06F 3/0338; G06F 3/0362; H03K 17/94; H03K 17/945; H03K 17/955; H03K 17/96; H03K 17/962; H03K 17/965; H03K 17/975
USPC .......................... 345/156–159, 161–167, 184; 361/679.1, 679.18; 463/37
See application file for complete search history.

(56) References Cited

U.S. PATENT DOCUMENTS

| | | | | |
|---|---|---|---|---|
| 4,200,780 A | * | 4/1980 | Romano | 463/37 |
| 5,012,230 A | * | 4/1991 | Yasuda | 345/160 |
| 5,142,805 A | * | 9/1992 | Horne et al. | 42/1.02 |
| 5,591,082 A | * | 1/1997 | Jensen et al. | 463/38 |
| 5,867,082 A | * | 2/1999 | Van Zeeland | 335/205 |
| 6,047,198 A | * | 4/2000 | Sudo | 455/566 |
| 6,069,327 A | * | 5/2000 | Ushimaru | 200/5 R |
| 6,072,471 A | * | 6/2000 | Lo | 345/163 |
| 6,128,006 A | * | 10/2000 | Rosenberg et al. | 345/163 |
| 6,496,180 B1 | * | 12/2002 | Hedman | 345/166 |
| 6,556,150 B1 | | 4/2003 | McLoone et al. | |
| 6,580,418 B1 | * | 6/2003 | Grome et al. | 345/161 |
| 6,590,564 B1 | | 7/2003 | McLoone et al. | |
| 6,608,263 B2 | * | 8/2003 | Myojin | 200/16 D |

(Continued)

FOREIGN PATENT DOCUMENTS

| | | |
|---|---|---|
| CN | 1157956 A | 8/1997 |
| JP | 8241168 A | 9/1996 |

(Continued)

OTHER PUBLICATIONS

International Search Report mailed Oct. 30, 2009 for Application No. PCT/SG2009/000137, filed Apr. 5, 2009, titled Ergonomic Slider-Based Selector, Applicant Razer (Asia-Pacific) Pte Ltd.

(Continued)

*Primary Examiner* — Joe H Cheng
*Assistant Examiner* — Keith Crawley
(74) *Attorney, Agent, or Firm* — Novak Druce Connolly Bove + Quigg LLP

(57) ABSTRACT

A device connectable to a computer is disclosed. The device comprises a selector defining a pathway and a plurality of positions along the pathway, the selector having a terminal displaceable along the pathway and positionable at one of the plurality of positions, the pathway being substantially straight, each of the plurality of positions having a process associated therewith. The device further comprises a sensor being operable for generating instruction signals. More specifically, the instruction signals are communicable to the computing device for executing thereon the process associated with one of the plurality of positions along the pathway whereat the terminal is positioned.

29 Claims, 2 Drawing Sheets

(56) References Cited

U.S. PATENT DOCUMENTS

| | | | |
|---|---|---|---|
| 6,623,194 B1* | 9/2003 | Lip | 400/472 |
| 6,664,947 B1 | 12/2003 | Vinogradov | |
| 6,864,679 B2* | 3/2005 | Yokoji et al. | 324/207.11 |
| 6,967,301 B2* | 11/2005 | Krajci et al. | 200/547 |
| 7,035,805 B1* | 4/2006 | Miller | 704/275 |
| 7,282,656 B2* | 10/2007 | Niiyama | 200/5 R |
| 7,440,767 B2* | 10/2008 | Ballay et al. | 455/507 |
| 7,927,216 B2* | 4/2011 | Ikeda et al. | 463/38 |
| 2002/0178624 A1* | 12/2002 | Yamamoto et al. | 37/348 |
| 2003/0137264 A1* | 7/2003 | Peterson et al. | 318/446 |
| 2003/0206202 A1* | 11/2003 | Moriya | 345/846 |
| 2004/0100440 A1* | 5/2004 | Levin et al. | 345/156 |
| 2005/0030279 A1* | 2/2005 | Fu | 345/156 |
| 2005/0040022 A1* | 2/2005 | Turner | 200/538 |
| 2005/0052425 A1* | 3/2005 | Zadesky et al. | 345/173 |
| 2005/0128186 A1* | 6/2005 | Shahoian et al. | 345/161 |
| 2005/0174331 A1* | 8/2005 | Vayda | 345/167 |
| 2005/0231468 A1* | 10/2005 | Chen et al. | 345/156 |
| 2006/0001657 A1* | 1/2006 | Monney et al. | 345/184 |
| 2006/0125785 A1* | 6/2006 | McAlindon | 345/156 |
| 2007/0063969 A1* | 3/2007 | Wright | 345/156 |
| 2007/0066394 A1* | 3/2007 | Ikeda et al. | 463/37 |
| 2007/0154870 A1* | 7/2007 | Ongkojoyo | 434/236 |
| 2007/0170048 A1* | 7/2007 | Kondo et al. | 200/5 R |
| 2007/0218995 A1* | 9/2007 | Didato | 463/37 |
| 2007/0236470 A1* | 10/2007 | Abanami et al. | 345/173 |
| 2007/0247426 A1* | 10/2007 | Vorst | 345/163 |
| 2007/0278073 A1* | 12/2007 | Yamamoto et al. | 200/61.54 |
| 2008/0184143 A1* | 7/2008 | Gottlieb et al. | 715/764 |
| 2008/0266258 A1* | 10/2008 | Chiang | 345/163 |
| 2009/0021483 A1* | 1/2009 | Hsu | 345/166 |
| 2009/0040175 A1* | 2/2009 | Xu et al. | 345/156 |
| 2010/0134414 A1* | 6/2010 | Cavacuiti | 345/158 |
| 2010/0321297 A1* | 12/2010 | Grunberger | 345/163 |
| 2011/0075328 A1* | 3/2011 | Shedletsky et al. | 361/679.01 |
| 2011/0081969 A1* | 4/2011 | Ikeda et al. | 463/37 |

FOREIGN PATENT DOCUMENTS

| | | |
|---|---|---|
| KR | 10-2000-0003291 A | 1/2000 |
| WO | 03081412 A2 | 10/2003 |

OTHER PUBLICATIONS

Office Action mailed Oct. 8, 2012 for Chinese national phase application No. 200980122241.0, international filed Apr. 5, 2009, titled Ergonomic Slider-Based Selector, Applicant Razer (Asia-Pacific) Pte Ltd.

* cited by examiner

ERGONOMIC SLIDER-BASED SELECTOR

FIELD OF INVENTION

The invention relates generally to interface devices. In particular, the invention relates to a peripheral device for controlling multiple processes executable on a computing device.

BACKGROUND

Pointing devices such as a computer mouse are typically used to manipulate the position of a cursor on a display screen of a computer. The pointing devices usually have buttons for activating processes that are executable on the computer. These processes include, for example, clicking on a search icon of an online search engine to initiate a search with respect to a search term.

A computer mouse typically consists of two buttons for activating the foregoing processes that are executable on the computer. In some processes involving online games, a separate peripheral device such as a keyboard is used together with the conventional computer mouse to activate the processes. Keys on the keyboard are used to select a desired process, such as choosing a weapon to be used for engaging an enemy troop in a gaming application. Once the desired process is selected, a button on the conventional computer mouse is actuated to activate the desired process. For instance, the button on the conventional computer mouse is actuated to open fire on the enemy troop using the chosen weapon.

However, it is desirable for many gamers of online games to select and activate the processes as quickly as possible, as well as avoiding accidental activation of the processes by the gamers during the online games. It is further desirable that the selection and activation of the processes are easily performed so that greater controllability is achieved.

Accordingly there is a need for improving the speed of selecting and activating processes and avoiding accidental activation of the processes that are executable on a computing device.

SUMMARY

Embodiments of the invention disclosed herein improve the speed of selecting and activating processes as well as avoiding accidental activation of the processes that are executable on a computing device.

In accordance to a first embodiment of the invention, a device is disclosed. The device comprises a transducer for generating displacement signals from displacement detected thereby and for communicating the displacement signals to a computing device for manipulating an object generated by the computing device. The device also comprises a selector defining a pathway and a plurality of positions along the pathway, the selector having a terminal displaceable along the pathway and positionable at one of the plurality of positions, the pathway being substantially straight, each of the plurality of positions having a process associated therewith. The device further comprises a sensor being operable for generating instruction signals. More specifically, instruction signals are communicable to the computing device for executing thereon the process associated with one of the plurality of positions along the pathway whereat the terminal is positioned.

In accordance to a second embodiment of the invention, a device is disclosed. The device comprises a selector defining a pathway and a plurality of positions along the pathway, the selector having a terminal displaceable along the pathway and positionable at one of the plurality of positions, the pathway being substantially straight, each of the plurality of positions having a process associated therewith. The device further comprises a sensor being operable for generating instruction signals, the sensor being integral with the terminal. More specifically, the instruction signals are communicable to the computing device for executing thereon the process associated with one of the plurality of positions along the pathway whereat the terminal is positioned.

In accordance to a third embodiment of the invention, a method for selecting processes executable on a computing device is disclosed. The method comprises generating displacement signals from displacement detected by a transducer. The method further comprises communicating the displacement signals to the computing device for manipulating an object generated by the computing device. The method yet further comprises defining a pathway and a plurality of positions along the pathway, the pathway being defined by a selector having a terminal displaceable along the pathway and positionable at one of the plurality of positions, the pathway being substantially straight, each of the plurality of positions having a process associated therewith. More specifically, instruction signals are communicable to the computing device for executing thereon the process associated with one of the plurality of positions along the pathway whereat the terminal is positioned.

In accordance to a fourth embodiment of the invention, a system for selecting processes executable on a computing device is disclosed. The system comprises a transducer for generating displacement signals from displacement detected thereby and for communicating the displacement signals to a computing device for manipulating an object generated by the computing device. The system also comprises a selector defining a pathway and a plurality of positions along the pathway, the selector having a terminal displaceable along the pathway and positionable at one of the plurality of positions, the pathway being substantially straight, each of the plurality of positions having a process associated therewith. The system further comprises a sensor being operable for generating instruction signals. More specifically, the instruction signals are communicable to the computing device for executing thereon the process associated with one of the plurality of positions along the pathway whereat the terminal is positioned.

BRIEF DESCRIPTION OF THE DRAWINGS

Embodiments of the invention are described hereinafter with reference to the drawings, in which.

DETAILED DESCRIPTION

Figure 1:
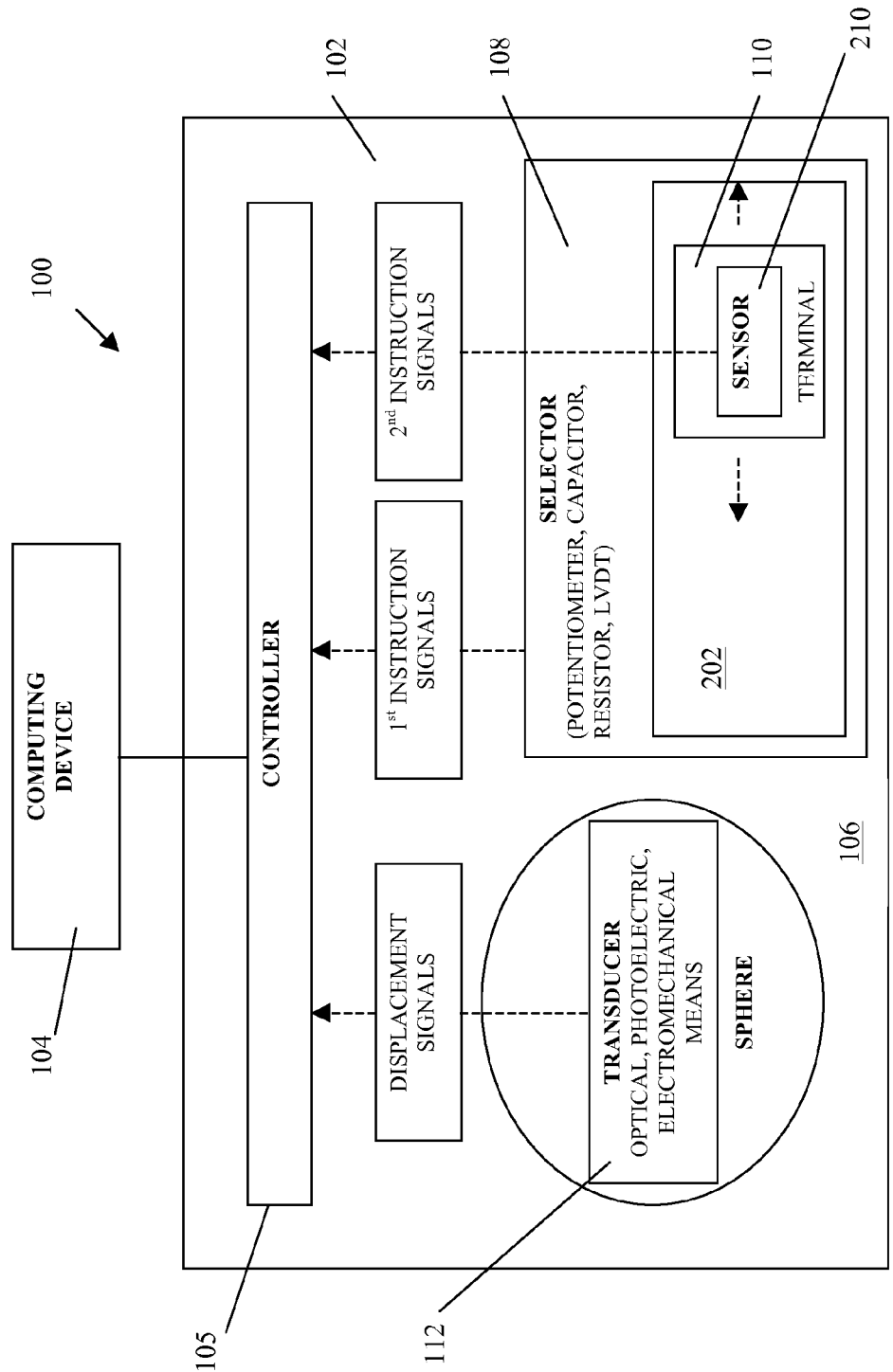
FIG. 1 is a schematic view of a device for improving the speed of selecting and activating processes executable on a computing device according to an embodiment of the invention.

With reference to the drawings, a device connectable to a computing device according to a preferred embodiment of the invention is disclosed. The preferred embodiment of the invention improves the speed of selecting and activating processes executable on the computing device.

Conventional devices lack the speed required for selecting and activating the processes as quickly as possible without accidental activation of the processes. Where it is desired that the selection and activation of the processes be performed without accidental activation of the processes, other conventional devices do not adequately prevent accidental activation of the processes.

For purposes of brevity and clarity, the description of the invention is limited hereinafter to a device connectable to the computing device for improving the speed of selecting and activating processes executable on the computing device. This however does not preclude embodiments of the invention from other applications that require improvement to the speed of selecting and activating processes executable on a computing device. The functional principles fundamental to the embodiments of the invention remain the same throughout the variations.

In the detailed description provided hereinafter and FIGS. 1 to 2b of the drawings, like elements are identified with like reference numerals.

The preferred embodiment of the invention is described in greater detail hereinafter for a device for improving the speed of selecting and activating processes executable on a computing device.

With reference to FIG. 1, a device 100, such as a computer pointing device or mouse having a body 102 is shown. The body 102 is preferably ergonomically shaped and is used to provide ergonomic support for a palm of a user of the device 100. The device 100 has a communication controller 105 such as PS2, USB or Bluetooth as known in the art for communicating with the computing device 104. Examples of the computing device 104 are desktop and laptop computers.

The device 100 and the computing device 104 are capable of establishing data communication therebetween. The computing device 104 is capable of receiving instruction signals for executing a selected process that is executable by the computing device 104. In particular, instruction signals are sent directly from the device 100 to the computing device 104 for executing the selected process executable in the computing device 104.

The body 102 has a surface 106 and a plurality of sides on which a selector 108 having a terminal 110 are formed. The body 102 also contains a transducer 112 that senses movement of the device 100. The controller 105 is coupled to the transducer 112 for communicating displacement signals to the computing device 104.For example, when the device 100 is embodied as a computer mouse, the transducer 112 preferably adopts optical, photoelectric and electromechanical means for sensing the movement of a mouse ball, trackball or surface thereacross. The displacement signals contain positional information of the device 100 that is used to vary the position of a cursor that is displayed on the screen of the computing device 104.

The selector 108 preferably senses position and/or displacement of the terminal 110, such as a sliding piece. The selector 108 is functionally operable using at least one of a potentiometer, capacitor, resistor, and linear variable displacement transducer (LVDT) for sending a first instruction signal to the computing device 104.

Figure 2B:
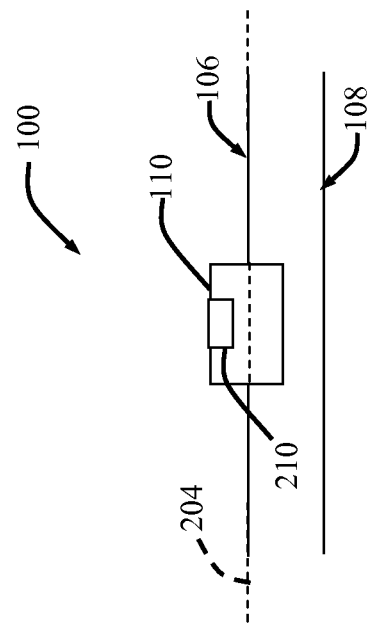
FIG. 2b is a cross-sectional view of the selector of FIG. 2a along an axis of a pathway.
Figure 2A:
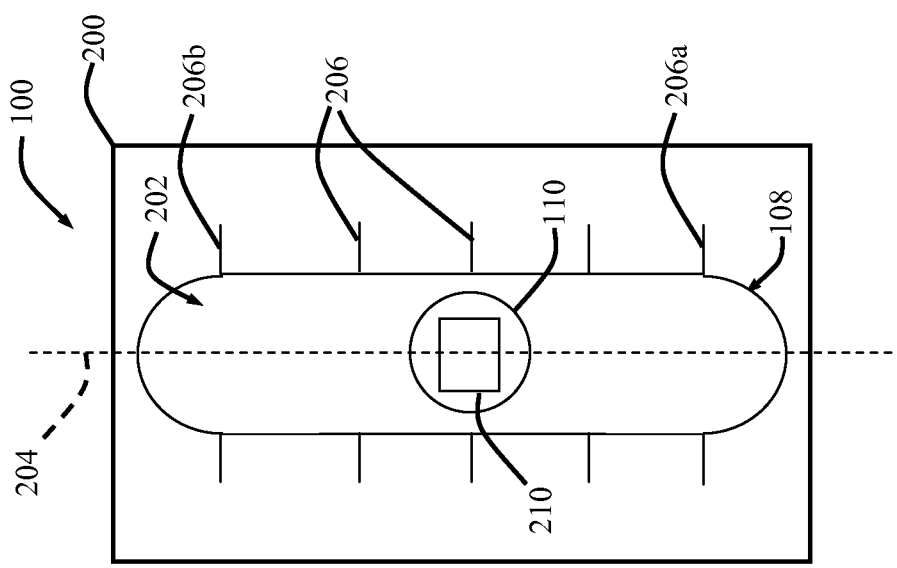
FIG. 2a is a plan view of an selector formed on a surface of the device of FIG. 1.

With reference to FIG. 2a and in accordance with the preferred embodiment of the invention, the selector 108 has a slider-based structure 200 that comprises a terminal 1 10. The terminal 110 is slidably actuatable along a pathway 202 having an axis 204 and is preferably positionable at predetermined locations 206 along the axis 204. The selector 108 is for one or more of selecting and activating one or more processes executable on the computing device 104.

For example, in an online military game, there is typically a process which involves selection of an appropriate weapon from a range of disposable weapons for a gamer to engage an enemy troop. The selector 108 is then used to activate a controlling function of the process such as firing of bullets from the chosen weapon at the enemy troop.

Each of the predetermined locations 206 preferably corresponds to a different process executable on the computing device 104. In this manner, the selector 108 is advantageously capable of selecting a desired process from a plurality of different processes by actuating the terminal 110 along the axis 204 to a desired position.

FIG. 2b shows a cross-sectional view of the selector 108 along the axis 204. A sensor 210 is preferably integrally formed with the terminal 110 for generating a second instruction signals to the computing device 104 via the controller 105. The sensor 210 is preferably one of a touch sensor and a switch for sending a second instruction signals when activated. In this way, the user may activate the sensor 210 and thereby send a second instruction signals to the controller 105, independently of the first instruction signals sent by the selector 108. Alternatively, the sensor 210 and the selector 108 are formed on different sides of the body 102 of the device 100.

In a further alternative embodiment of the invention, the device 100 is part of a system that includes other peripheral devices (not shown). More specifically, the selector 108 is formed on the device 100 while the sensor 210 is formed on another peripheral device, such as a keyboard or keypad, and is in signal communication with the selector 108.

When operated, the selector 108 and sensor 210 signal communicate with each other via the controller 105 for generating instructions conveyable to the computing device 104. The signals from each of the selector 108 and sensor 210 are preferably sent to the computing device 104 as separate instructions segments contained in the form of instruction signals or instruction segment packets. The instruction segments are sent to the computing device 104 whenever one or both of the selector 108 and sensor 210 are operated. The instruction segments collectively enable execution of the selected process of the computing device 104.

Alternatively, the selector 108 and sensor 210 send an operate signal to the computing device 104 via the controller 105 to form a single instruction for the computing device 104 to execute the selected process. This means that the operate signal is preferably sent to the computing device 104 only when both of the selector 108 and sensor 210 are being operated. Preferably, the operate signal is generated by the controller 105 upon detecting signals from both the selector 108 and sensor 210.

The user is therefore able to operate the sensor 210, for example through movement of the user's finger on the sensor 210, for activating the process executable on the computing device 104. The use of the selector 108 and sensor 210 advantageously prevents accidental activation of the process by the user's finger during the game.

Alternatively, the selector 108 has a click button configuration (not shown). The terminal 110 comprises a click button that is actuatable along the axis 204 and depressible along the second axis 208. The terminal 110 preferably produces a clicking sensation when being displaced from one to another of the predetermined locations 206. This provides an indication to the user when the terminal 110 is positioned at one of the predetermined locations 206.

In the foregoing online military game example, the chosen weapon begins firing when the gamer operate the sensor 210. The chosen weapon cease firing when the gamer stops operating the sensor 210. Firing of the chosen weapon resumes when the gamer operate the sensor 210.

As the gamer progresses through the online military game, different weapons are preferably selectable for engaging different enemy components during a battle scene. The terminal 110 is displaceable to different positions 206 along the axis 204 so as to allow the gamer to select an appropriate weapon for engaging a particular enemy component during a battle scene.

For example, if a tank appears in the battle scene, an anti-tank gun is first selected by actuating the terminal 110 to a first position 206a along the axis 204 and then fired by depressing the terminal 110 along the second axis 208. If a support weapon is required to suppress an enemy troop, a general-purpose machine gun (GPMG) is preferably chosen by first actuating the terminal 110 to a second position 206b along the axis 204 and then fired by operate the sensor 210.

The selector 108 therefore advantageously allows the user to select, activate and control a plurality of processes that are executable on the computing device 104. Additionally, the selector 108 is preferably ergonomically shaped and positioned on the device 100 so that the user requires minimal effort in actuating the selector 108. In this manner, the user is capable of improving the response time or speed for activating the plurality of processes that are executable on the computing device 104.

Furthermore, the selector 108 is preferably adapted to complement or replace buttons of conventional peripheral devices such as a conventional computer mouse. The selector 108 is therefore capable of being used in other software applications, for example, for creating graphic designs.

In the graphic design application example and with reference to FIG. 2a, different geometrical shapes are selectable by actuating the terminal 110 along the axis 204 to a position that corresponds to a desired geometrical shape. The sensor 210 is then operated for varying the size of the geometrical shape.

An indicator (not shown) is preferably formed on the surface 106 of the body 102 for indicating the selection of the plurality of processes that are executable on the computing device 104. Alternatively, the indicator is displayable on a display means, such as a monitor, of the computing device 104. This provides a visual indication to the user during the selection of the plurality of processes. The clicking sensation sensed by a user during displacement of the actual member along the axis 204 also aids in indicating relative displacement of the terminal 110 to the user.

The function of the device 100 providing instruction specific signals should be differentiated from function of providing instruction toggling signals. The instruction specific signal is indicative of a specific instruction for selection and/or execution of a particular signal whereas the instruction toggling signal is for toggling between instructions and hence dependent on not only the current selected instruction but also on the ordering of the instructions.

However, this does not preclude use of the instruction toggling signals with the instruction specific signals where the terminal 110 of the device 100 is for indicating one of multiple signals corresponding to multiple buttons on conventional peripheral devices wherein operating of the sensor 210 will result in the toggling of the button indicated by the terminal 110.

Although only a preferred embodiment of the invention is disclosed, it becomes apparent to one skilled in the art in view of this disclosure that numerous changes or modification can be made without departing from the scope and spirit of the invention. For example, although the terminal is actuatable along a longitudinal axis in the forgoing embodiment, the terminal may be formed on a curved surface and therefore actuated along an axis that is curved.

The invention claimed is:

1. A computer mouse device comprising:
   a body;
   a transducer for generating displacement signals from a movement of the computer mouse device and for communicating the displacement signals to a computing device;
   a selector located along a side of the body for generating a first instruction signal and a second instruction signal; the selector comprising:
      a pathway defined along the side of the body, the pathway having a length, a plurality of positions defined along the length thereof, the pathway running along a longitudinal axis of the selector, each position of the plurality of positions associated with one process of a plurality of processes executable on the computing device;
      a terminal displaceable along the length of the pathway and positionable between the plurality of positions, wherein the displacing of the terminal stays the terminal in place between each position of the plurality of positions along the length of the pathway; and
      a first switch disposed on the terminal, wherein the first switch is actuatable to enable user-selection of a corresponding process of the plurality of processes for execution on the computing device;
      wherein the displacing of the terminal to each position of the plurality of positions toggles to the corresponding process of each position and generates the first instruction signal; and
      wherein the actuating of the first switch selects the corresponding process of the plurality of processes and generates the second instruction signal;
   a sensor configured to generate a third instruction signal transmittable to the computer device; and
   a controller configured for generating an operate signal upon detecting both the second instruction signal and the third instruction signal,
   wherein the operate signal executes the corresponding process of the plurality of processes on the computing device.

2. The device of claim 1, wherein the controller is further configured to communicate the displacement signals to the computing device.

3. The device of claim 1, wherein the sensor is positioned at a top surface of the terminal.

4. The device of claim 3, wherein the sensor is one of a touch sensor and a second switch.

5. The device of claim 1, wherein the plurality of positions comprises a rest position, and wherein the terminal is biased towards the rest position.

6. The device of claim 1, wherein the transducer senses displacement through the use of at least one of optical, photoelectric and electromechanical means.

7. The device of claim 1, wherein the transducer senses displacement of a sphere thereacross.

8. The device of claim 1, wherein the selector is functionally operable to generate each of the first instruction signal and the second instruction signal using at least one of a potentiometer, capacitor, resistor and linear variable displacement transducer (LVDT).

9. The device of claim 1, wherein the second instruction signal generated by the selector is at least one of independently generated and independently transmitted from the third instruction signal generated by the sensor.

10. The device of claim 1, wherein the plurality of processes relates to a plurality of weapons selectable for use in a game executed on the computing device, and wherein the displacement of the terminal to a particular position of the plurality of positions thereby enables user-selection of a corresponding weapon of the plurality of weapons for use in the game executed on the computing device.

11. A method for selecting processes executable on a computing device with a computer mouse device, the method comprising:
generating displacement signals from displacement of the computer mouse device detected by a transducer;
communicating the displacement signals to the computing;
providing a selector for generating a first instruction signal and a second instruction signal, the selector disposed along a side of the device, the selector comprising a pathway having a length and a plurality of positions along the length of the pathway, the pathway running along a longitudinal axis of the selector;
associating each position of the plurality of positions with one process of a plurality of processes executable on the computer device;
displacing a terminal along the pathway and positioning the terminal between the plurality of positions, wherein the displacing of the terminal stays the terminal in place between each position of the plurality of positions along the length of the pathway;
providing a first switch disposed on the terminal, wherein the first switch is actuatable to enable user-selection of a corresponding process of the plurality of processes for execution on the computing device;
displacing the terminal to each position of the plurality of positions;
toggling to the corresponding process of each position and generating the first instruction signal in response to the displacing of the terminal to each position;
actuating the first switch;
selecting the corresponding process of the plurality of processes and generating the second instruction signal in response to the actuating of the first switch;
providing a sensor configured for generating a third instruction signal transmittable to the computing device;
generating an operate signal upon detecting both the second instruction signal and the third instruction signal; and
executing the corresponding process of the plurality of processes on the computing device.

12. The method of claim 11, wherein the sensor is positioned at a top surface of the terminal.

13. The method of claim 12, wherein the sensor is one of a touch sensor and a second switch.

14. The method of claim 11, wherein the plurality of positions comprises a rest position, the terminal being biased towards the rest position.

15. The method of claim 11, wherein the transducer senses displacement of the computing device through the use of at least one of optical, photoelectric and electromechanical means.

16. The method of claim 11, wherein the transducer senses displacement of a sphere thereacross.

17. The method of claim 11, wherein the selector is functionally operable for generating each of the first instruction signal and the second instruction signal using at least one of a potentiometer, capacitor, resistor and linear variable displacement transducer (LVDT).

18. The method of claim 11, wherein the third instruction signal generated by the sensor is at least one of independently generated and independently transmitted to the computing device from the second instruction signal generated by the selector.

19. A system comprising:
a computing device; and
a computer mouse device comprising:
a body;
a transducer for generating displacement signals from a movement of the computer mouse device and for communicating the displacement signals to a computing device; and
a selector for generating a first instruction signal and a second instruction signal, the selector located along a side of the body; the selector comprising:
a pathway defined along the side of the body, the pathway having a length, a plurality of positions defined along the length thereof, each position of the plurality of positions associated with one process of a plurality of processes executable on the computing device, the pathway further running along a longitudinal axis of the selector; and
a terminal displaceable along the length of the pathway and positionable between the plurality of positions wherein the displacing of the terminal stays the terminal in place between each position of the plurality of positions along the length of the pathway; and
a first switch disposed on the terminal wherein the first switch is actuatable to enable user-selection of a corresponding process of the plurality of processes for execution on the computing device;
wherein the displacing of the terminal to each position of the plurality of positions Toggles to the corresponding process of each position and generates the first instruction signal; and
wherein the actuating of the first switch selects the corresponding process of the plurality of processes and generates the second instruction signal;
a sensor configured to generate a third instruction signal transmittable to the computer device; and
a controller configured for generating an operate signal upon detecting both the second instruction signal and the third instruction signal;
wherein the operate signal executes the corresponding process of the plurality of processes on the computing device.

20. The system of claim 19, wherein the controller is further configured to communicate the displacement signals to the computing device.

21. The system of claim 19, wherein the sensor is positioned at a top surface of the terminal.

22. The system of claim 19, wherein the plurality of positions comprises a rest position, and wherein the terminal is biased towards the rest position.

23. The system of claim 19, wherein the transducer senses displacement through the use of at least one of optical, photoelectric and electromechanical means.

24. The system of claim 19, wherein the transducer senses displacement of a sphere thereacross.

25. The system of claim 19, wherein the selector is functionally operable to generate each of the first instruction signal and the second instruction signals using at least one of a potentiometer, capacitor, resistor and linear variable displacement transducer (LVDT).

26. The system of claim 25, wherein the sensor is one of a touch sensor and a second switch.

27. The system of claim 19, wherein the second instruction signal generated by the selector are at least one of independently generated and independently transmitted from the third instruction signal generated by the sensor.

28. The system of claim 19, wherein the sensor is formed on a second peripheral device.

29. The system of claim 28, wherein the second peripheral device is any of a keyboard and a keypad.

* * * * *